(12) United States Patent
Cho et al.

(10) Patent No.: US 6,820,192 B2
(45) Date of Patent: Nov. 16, 2004

(54) CENTRAL PROCESSING UNIT FOR EASILY TESTING AND DEBUGGING PROGRAMS

(75) Inventors: Kyung Y Cho, Pusan (KR); Jong Y Lim, Seoul (KR); Geun T Lee, Seoul (KR); Sang S Han, Incheon (KR); Byung G Min, Kyungki-Do (KR); Heui Lee, Kyungki-Do (KR)

(73) Assignee: Advanced Digital Chips Inc., Seoul (KR)

( * ) Notice: Subject to any disclaimer, the term of this patent is extended or adjusted under 35 U.S.C. 154(b) by 646 days.

(21) Appl. No.: 09/841,875

(22) Filed: Apr. 26, 2001

(65) Prior Publication Data

US 2002/0007451 A1 Jan. 17, 2002

(30) Foreign Application Priority Data

Jul. 5, 2000 (KR) ......................................... 2000-38161

(51) Int. Cl.⁷ ......................... G06F 9/445; G06F 11/36
(52) U.S. Cl. ......................... 712/227; 712/202; 714/23; 714/35; 717/124; 717/129
(58) Field of Search ................................. 712/202, 227, 712/248, 224; 717/124, 129, 138; 714/23, 35, 39, 40

(56) References Cited

U.S. PATENT DOCUMENTS 5,126,541 A * 6/1992 Shinagawa .................. 235/438
6,223,275 B1 * 4/2001 Goto et al. .................. 712/200
6,567,910 B2 * 5/2003 Tessarolo et al. ........... 712/227

FOREIGN PATENT DOCUMENTS

KR 20000038161 6/2000

* cited by examiner

Primary Examiner—Daniel H Pan
(74) Attorney, Agent, or Firm—Park & Sutton LLP; John K. Park (57) ABSTRACT

A central processing unit (CPU) for easily testing and debugging an application program, which includes a data communications unit for performing data communications with a host computer, a status register having a flag representing whether an operational mode of the CPU is a general operational mode representing a general operational state or a debugging mode representing a debugging state, a debugging stack pointer register which is used as a stack pointer designating a stack memory storing data of a debugging program, and a comparator for comparing a value stored in a break register with break data, wherein the CPU is converted into the debugging mode if the break register value is same as the break data, the flag of the status register has a value representing a debugging mode, a start address for performing a debugging program is loaded in a program counter, and the debugging program is executed to perform a debugging according to a command from the host computer via the data communications unit.

31 Claims, 4 Drawing Sheets

CENTRAL PROCESSING UNIT FOR EASILY TESTING AND DEBUGGING PROGRAMS

CLAIMING FOREIGN PRIORITY

The applicant claims and requests a foreign priority, through the Paris Convention for the Protection of Industry Property, based on a patent application filed in the Republic of Korea (South Korea) with the filing date of Jul. 5, 2000, with the patent application number 2000-0038161, by the applicant. (See the Attached Declaration)

BACKGROUND OF THE INVENTION

1. Field of the Invention

The present invention relates to a central processing unit (CPU) for easily testing and debugging programs, and more particularly, to a CPU for easily testing and debugging programs in which testing and debugging application programs that have been downloaded from a host computer at a debugging state can be easily tested and debugged.

2. Description of Prior Art

In general, a CPU or a microprocessor reads a program made of a set of a plurality of instruction words stored in a memory, parses the instruction words by an instruction parser and executes an operation corresponding to each instruction word by an execution unit.

It should be tested whether an application program made of a set of the plurality of instruction words stored in a memory is correctly made up. In the case that an application program is not correctly made up, the application program should be debugged.

Figure 1:
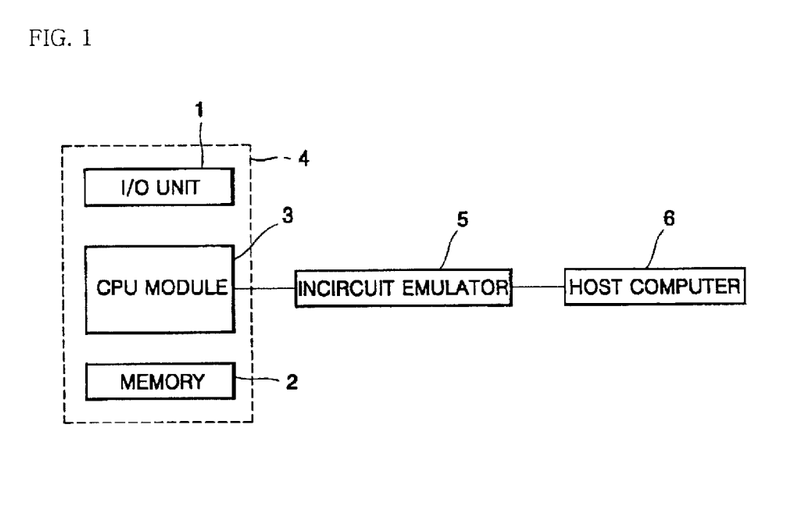
FIG. 1 is a block diagram showing a device for testing and debugging programs by using a conventional in-circuit emulator.

FIG. 1 is a block diagram showing an example for testing and debugging application programs by using a conventional in-circuit emulator.

A system for testing and debugging programs using an in-circuit emulator includes an object system 4 having a CPU module 3, an input/output (I/O) unit 1 and a memory 2, an in-circuit emulator (ICE) 5 connected to the CPU module 3 by which has replaced the CPU in the object system 4, in which the CPU in the object system 4 is replaced with the CPU module 3 in order to test and debug the object system 4, and a host computer 6 outputting instructions for testing and debugging application programs for debugging to an in-circuit emulator.

The in-circuit emulator 5 receives an application program from the host computer 6 and stores a debugging program capable of debugging the application program, and activates a central processing unit (CPU) that is located in the in-circuit emulator according to a command input from the host computer 6. Also, the in-circuit emulator 5 directly controls a control bus, an address bus and a data bus that are located in the object system 4 through the CPU module 3, in order to perform an input/output operation necessary for an input/output unit 2 and a memory 2. Also, the in-circuit emulator 5 can read an inner register of the CPU within the in-circuit emulator 5 or alter data in the inner register.

That is, the in-circuit emulator 5 receives the debugging application program from the host computer, runs the program, and operates the CPU within the in-circuit emulator 5. Also, the in-circuit emulator 5 directly controls a control bus, an address bus and a data bus that are located in the object system 4 through the CPU module 3, in order to perform an input/output operation necessary for the input/output unit 2 and the memory 2, and stops running of the application program compulsively in order to test and debug the application program. Then, data is read or written with respect to the input/output unit 1 and the memory 2 in the object system 4, or data stored in the register within the in-circuit emulator 5 is read or written, according to the command from the host computer 6. Accordingly, it is judged whether the application program is correctly made up. If there is an error, the application program is debugged.

The in-circuit emulator 5 can be useful only in the case that the CPU in the object system can be replaced with the CPU module 3 connected to the in-circuit emulator 5, when the application program is tested and debugged using the conventional in-circuit emulator. Also, since a hardware unit functioning as the CPU of the object system should exist in the in-circuit emulator 5, it is problematic that the in-circuit emulator is highly expensive. Also, since the CPU located within the in-circuit emulator cannot be replaced with the CPU module 3 in the case that the object system is integrated with a single semiconductor chip, the in-circuit emulator cannot be used.

Figure 2:
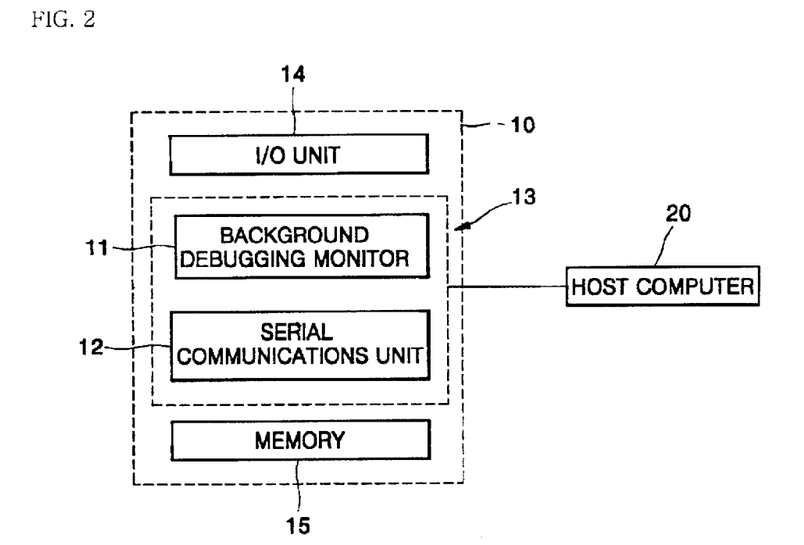
FIG. 2 is a block diagram showing a device for testing and debugging programs in which a serial communications unit and a background debugging monitor unit are incorporated in a conventional central processing unit (CPU)

FIG. 2 is a block diagram showing a device showing a device for testing and debugging a program in which a serial communications unit 12 and a background debugging monitor 11 are incorporated in a conventional central processing unit (CPU) 13.

Referring to FIG. 2, the CPU 13 includes the background debugging monitor (DBM) 11 and the serial communications unit 12, in order to solve the problem that the in-circuit emulator cannot be used in the case that the object system of FIG. 1 has been integrated into a single semiconductor chip.

The FIG. 2 device includes the object system 10 in which the CPU 13 having the BDM 11 and the serial communications unit 12, the input/output (I/O) unit 14 and the memory 15 are integrated into a single semiconductor chip, and a host computer 20 for testing and debugging an application program via the serial communications unit 12.

The BDM 11 should be able to directly control all internal elements located in the CPU 13, with a controller including a register and a control unit, in order to parse a command input via the serial communications unit 12 from the host computer 20, to thereby perform necessary operations. That is, the BDM 11 is connected to an internal bus to read or alter the value stored in the register. The BDM 11 controls a controller, a memory address register, and a memory data register, to thereby control a control signal bus, an address bus and a data bus, which are not shown in FIG. 2.

In the CPU including the conventional BDM as shown in FIG. 2, the host computer 20 should communicate with the BDM 11 via the serial communications unit 12. In this case, the required number of the input/output lines for connecting the host computer 20 and the CPU 13 is two or three. Accordingly, the testing and debugging device of FIG. 2 is more efficient than the case that the whole CPU is replaced as show in FIG. 1.

However, since the conventional BDM 11 should directly control all the internal elements in the CPU 13, the CPU incorporated with the BDM of FIG. 2 is expensive and has a complicated hardware device.

SUMMARY OF THE INVENTION

To solve the prior art problems, it is an object of the present invention to provide a central processing unit (CPU) facilitating a program testing and debugging operation, in which a debugging mode is newly added in the CPU having a user mode by activating a debugging input signal and an application program for testing and debugging downloaded from a host computer at the debugging mode is easily tested and debugged, to thereby simplify hardware of the CPU to lower price of the CPU and perform a more efficient testing and debugging operation.

To accomplish the above object of the present invention, according to the present invention, there is provided a central processing unit (CPU) for easily testing and debugging a program, the CPU comprising: a data communications unit for performing data communications with a host computer; a status register having a flag representing whether an operational mode of the CPU is a general operational mode representing a general operational state or a debugging mode representing a debugging state; a debugging stack pointer register which is used as a stack pointer designating a stack memory storing data of a debugging program; and a comparator for comparing a value stored in a break register with break data, wherein the CPU is converted into the debugging mode if the break register value is same as the break data, the flag of the status register has a value representing a debugging mode, a start address for performing a debugging program is loaded in a program counter, and the debugging program is executed to perform a debugging according to a command from the host computer via the data communications unit.

According to another aspect of the present invention, there is provided a central processing unit (CPU) for easily testing and debugging a program, the CPU comprising: a data communications unit for performing data communications with a host computer; a status register having a flag representing whether an operational mode of the CPU is a general operational mode representing a general operational state or a debugging mode representing a debugging state; a debugging stack pointer register designating a stack memory storing data of a debugging initialization program and data of a debugging service program; a control unit for initializing the CPU by a rest signal, checking a debugging mode proceeding signal, loading a start address for performing a debugging initializing program in a program counter if the debugging mode proceeding signal has been activated, to thereby converting the CPU into the debugging initialization mode, and setting the flag of the status register into a value representing the debugging mode, and outputting various control signals necessary for internal and external components of the CPU connected to an internal bus; and a comparator for comparing a value stored in a break register with break data, wherein the CPU is converted into the debugging mode if the break register value is same as the break data, the flag of the status register has a value representing a debugging service mode, a start address for performing a debugging service program is loaded in a program counter, and the debugging service program is executed to perform a debugging according to a command from the host computer via the data communications unit.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE EMBODIMENT

A central processing unit (CPU) according to a preferred embodiment of the present invention will be described in more detail with reference to the accompanying drawings.

Figure 3:
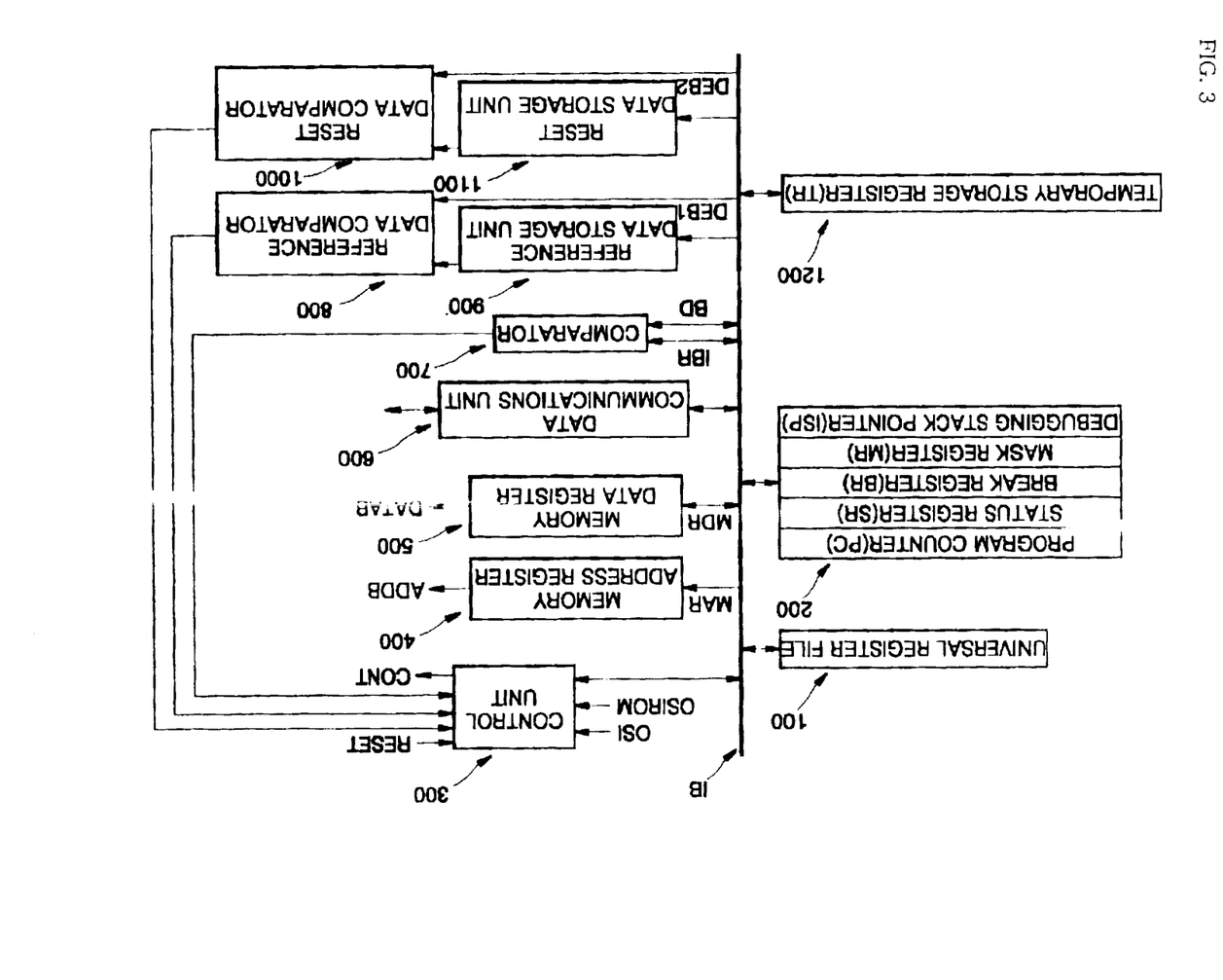
FIG. 3 is a block diagram of a CPU for easily testing and debugging programs according to the present invention.

FIG. 3 is a block diagram of a CPU for easily testing and debugging programs according to the present invention.

In FIG. 3, the CPU for easily testing and debugging programs according to the present invention includes a universal register file 100 temporarily storing data and data necessary for address operation, a special register file 200 including a program counter (PC) storing a memory address at which a program is stored, a status register (SR) having a flag representing whether an operational mode of the CPU is a general operational mode representing a general operational state or a debugging mode representing a program testing and debugging state, a break register (BR), a mask register (MR), and a debugging stack pointer (ISP) designating a memory storing data of a debugging initialization program and a debugging service program, an internal bus (IB) connecting the universal register file 100 and the special register file 200, a control unit 300 connected to the internal bus (IB) for outputting various control signals (CONT) necessary for internal and external components of the CPU, initializing the CPU by a reset signal (RESET), checking a debugging mode proceeding signal (OSI) to thereby load a start address for performing a debugging initialization program in the program counter to convert the CPU into a debugging initialization mode if the debugging mode proceeding signal (OSI) has been activated and to make the flag of the status register (SR) have a value representing the debugging mode, a memory address register 400, a memory data register 500, a data communications unit 600 performing data communications with the host computer, and a comparator 700 comparing the value (IBR) stored in the break register (BR) with break data (BD), and converting the CPU into a debugging service mode if the break register value is same as the break data.

Also, as an alternative, the CPU for easily testing and debugging programs according to the present invention includes a data communications unit 600 performing data communications with the host computer, a status register (SR) having a flag representing whether an operational mode of the CPU is a general operational mode representing a general operational state or a debugging mode representing a program testing and debugging state, and a debugging stack pointer (ISP) which is used as a stack pointer designating a memory storing data of a debugging program, and a comparator 700 comparing the value stored in the break register with break data, and converting the CPU into a debugging mode if the break register value is same as the break data, in which a start address for performing a debugging program composed of a debugging initialization program and a debugging service program is loaded in a program counter (PC) if the value stored in the break register (BR) is same as the break data (BD) which are input from the host computer according to an initial debugging mode entry, to thereby execute a debugging program to convert the CPU into the debugging mode and to perform a debugging according to a command from the host computer via the data communications unit 600 in which case the status register flag has a value representing the debugging mode.

The break data (BD) input to the comparator 700 may be program addresses stored in the program counter (PC), memory addresses at which data is stored, input and output data, and input and output addresses. Also, using the mask register (MR), the break data (BD) may be a result of operation of the program address stored in the program counter with the value stored in the mask register (MR), a result of operation of the memory address at which data is stored with the value stored in the mask register (MR), and a result of operation of the input and output address with the value stored in the mask register (MR)

Figure 5A:
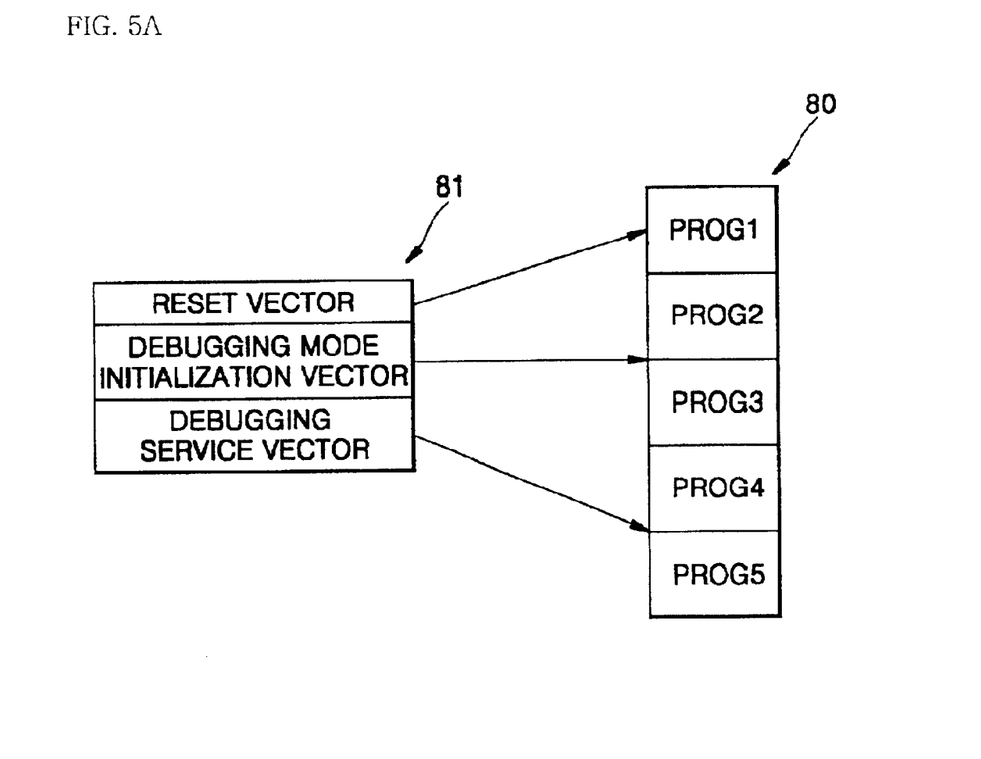
FIG. 5A is an operational diagram showing a vector processing in the case that application programs for general operations and debugging programs are stored in an identical memory.
Figure 5B:
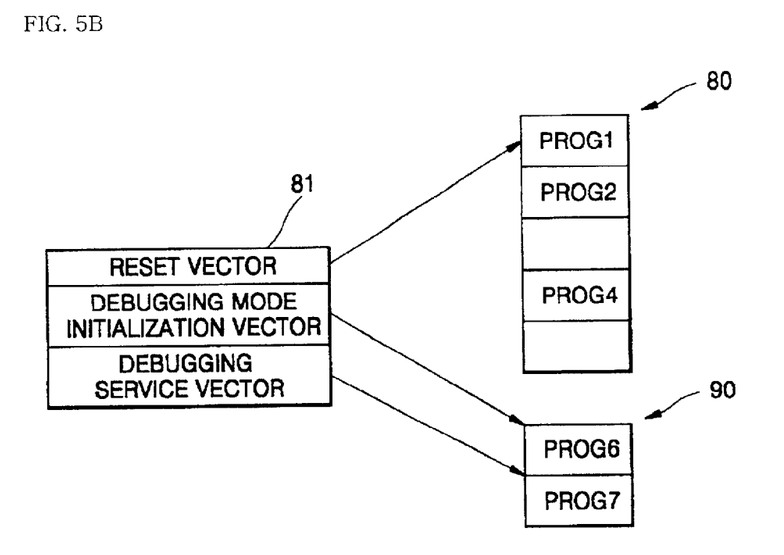
FIG. 5B is an operational diagram showing a vector processing in the case that debugging programs are stored in an independent memory different from that of application programs for general operations.

As shown in FIGS. 3, 5A and 5B, the control unit 300 receives a debugging memory select signal (OSIROM) and can load respectively different addresses for executing debugging service programs PROG5 and PROG7 in the program counter (PC) according to the debugging memory select signal (OSIROM) when the value (IBR) stored in the break register (BR) is same as the break data (BD). In addition, as shown in FIG. 5B, a memory 90 storing a debugging program including a debugging initialization program (PROG6) and a debugging service program (PROG7) can be separated from a memory 80 storing general programs.

In other words, a data storage memory storing data values used for the debugging program can be separated from a data storage memory storing data values used for the general programs.

When the CPU is converted into a debugging mode, the CPU for easily performing a program testing and debugging should further include a temporary storage register 1200 for quick debugging, and stores the program counter (PC) and the status register (SR) in the temporary storage register 1200, prior to executing the debugging program after the CPU has been converted into the debugging mode and then executes the debugging program.

The CPU for easily testing and debugging a program further includes a reference data storage unit 900 on which reference data is stored, and a reference data comparator 800 for comparing data (DEB1) input via the data communications unit 600 with the reference data and then converting the CPU into a debugging service mode if the data (DEB1) is same as the reference data, to thereby allow a user to make the CPU converted compulsorily into the debugging service mode via the data communications unit using the host computer to execute the debugging service program.

The CPU for easily testing and debugging a program according to the present invention further includes a reset data storage unit 1100 storing reset data which has been set in advance, and a reset data comparator 1000 for comparing the reset data stored in the reset data storage unit 1100 with the debugging data (DEB2) input via the data communications unit 600. Accordingly, if a user transmits data from the host computer to the data communications unit 600 in order to compulsorily initialize the CPU, the comparator 1000 compares the reset data stored in the reset data storage unit 1100 with the value received via the data communications unit 600, to thereby initialize the CPU in the case that both values are same.

The operation of the CPU for easily testing and debugging a program according to the present invention will follow.

Figure 4:
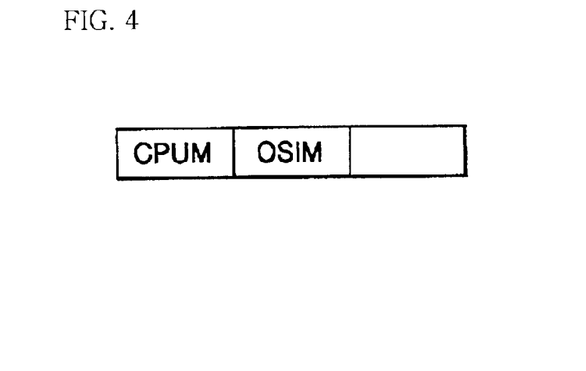
FIG. 4 is a diagram showing a status register for testing and debugging programs according to the present invention.

The control unit 300 initializes the CPU by a reset signal, and activates a debugging mode flag (OSIM) of the status register (SR) as shown in FIG. 4, if a debugging mode entry signal (OSI) input to the control unit 300 is activated. Then, the control unit 300 sets the CPU into an initial circumstance for testing and debugging an application program, and executes the application program to be tested and debugged downloaded from the host computer to the CPU via the data communications unit 600. During execution of the application program, the comparator 700 judges whether the value (IBR) stored in the break register (BR) is same as the break data (BD). If both the values are same, the control unit 300 makes the CPU advance to the debugging mode and performs a testing and debugging of the application program according to a command input from the host computer via the data communications unit 600.

After the debugging mode entry signal (OSI) is activated and thus the CPU is set as an initial circumstance for testing and debugging an application program, the application program is downloaded from the host computer to the CPU. Otherwise, after the CPU is set as an initial circumstance and if the value (IBR) stored in the break register (BR) is same as the break data (BD) in the comparison result of the comparator 700, the CPU advances to the program testing and debugging state and then the application program is downloaded from the host computer to the CPU.

If the value (IBR) stored in the break register (BR) is same as the break data (BD) in the comparison result of the comparator 700, the control unit 300 stops or completes the execution of the application program, controls the value stored in the program counter (PC) and the data stored in the status register (SR) to be stored in the stack memory designated by the temporary storage register (TR) or the debugging stack pointer (ISP), controls a start address for executing a debugging service program to be stored in the program counter (PC) in order to test and debug the application program, and alters data of the status register (SR) so that the CPU is at the state of testing and debugging the application program.

The break data (BD) input to the comparator 700 may be program addresses stored in the program counter (PC), memory addresses at which data is stored, input and output data, and input and output addresses. Also, using the mask register (MR), the break data (BD) may be a result of operation of the program address stored in the program counter with the value stored in the mask register (MR), a result of operation of the memory address at which data is stored with the value stored in the mask register (MR), a result of operation of the input and output address with the value stored in the mask register (MR), and a result of operation of the input and output data with the value stored in the mask register (MR). The mask register (MR) is useful when only a portion of data to be checked is compared. That is, in the case that only six lower bits among the input and output data are checked, the value of 3F in hexadecimal digit is set in the mask register (MR), and the input and output data is logically multiplied with the value set in the mask register (MR). Then, if the six lower bits of the break data (BD) are same as the six lower bits of the break register (BR), the CPU is made converted into a debugging mode.

As shown in FIG. 5A, application programs (PROG1, PROG2 and PROG4) for initialization and general operations of the CPU, a debugging mode initialization program (PROG3) for setting the CPU into an initial circumstance for testing and debugging the application programs according to activation of the debugging mode entry signal (OSI), and a debugging service program (PROG5) for testing and debugging the application programs if the CPU advances to the program testing and debugging state in the comparison result of the comparator, are stored in the same memory 80. Otherwise, as shown in FIG. 5B, the debugging mode initialization program (PROG6) and the debugging service program (PROG7) can be stored in another independent memory 90.

As shown in FIG. 5B, the memory 80 for storing the application programs (PROG1, PROG2 and PROG4) for initialization and general operations of the CPU and the memory 90 for storing the debugging mode initialization program (PROG6) and the debugging service program (PROG7) are separated from each other. In this case, if the memory 90 is integrated with the CPU, the operational speed of the CPU becomes faster.

Figure 5C:
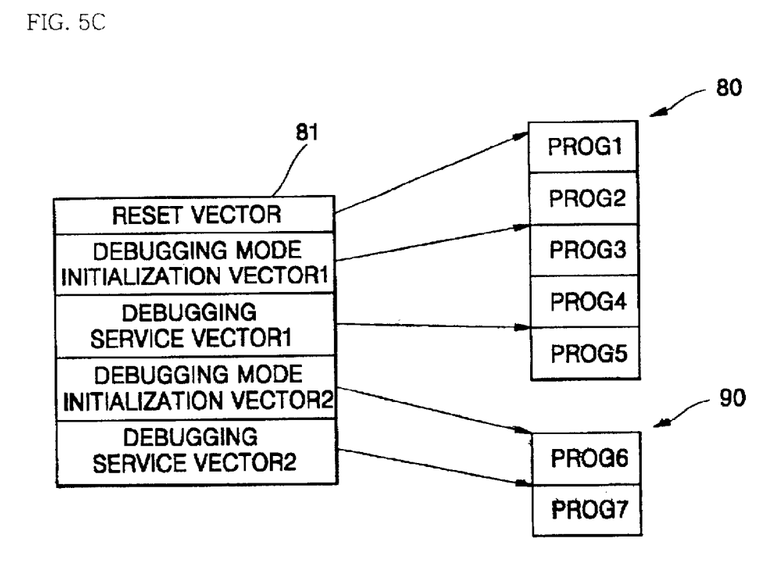
FIG. 5C is an operational diagram showing a vector processing in the case that debugging programs are stored both in the same memory as that of application programs for general operations and in an independent memory different from that of application programs for general operations.

Alternatively, as shown in FIG. 5C, independently of the memory 90 for storing the debugging mode initialization program (PROG6) and the debugging service program (PROG7), which is integrated with the CPU, a user can make up the debugging mode initialization program (PROG3) and the debugging service program (PROG5), and can store them in the memory 80 for storing the application programs (PROG1, PROG2 and PROG4) for initialization and general operations of the CPU.

In the case that all of the application programs (PROG1, PROG2 and PROG4) for initialization and general operations of the CPU, the debugging mode initialization program (PROG3) and the debugging service program (PROG5) are stored in the same memory 80 as shown in FIG. 5A, the operation of the present invention will be described below in more detail.

If power is supplied to the CPU, a reset signal (RESET) is activated. The control unit 300 initializes the CPU according to the reset signal (RESET), and judges whether the debugging mode entry signal (OSI) is activated or not. If the debugging mode entry signal (OSI) is in an inactivation state, the debugging mode flag (OSIM) of the status register (SR) of FIG. 4 is inactivated. Then, the control unit 300 reads from a vector table 81 a reset vector storing an address of the memory 80 storing an initial program to be executed, and stores the program counter (PC) of the special register file 200. The control unit 300 moves the reset vector stored in the program counter (PC) to the memory address register 400 and outputs it to the address bus (ADDB). Also, the control unit 300 outputs a memory read signal to a control bus and reads the content of the memory 80 storing the application program (PROG1). The data output from the memory enters the control unit 300 via a memory data bus (DATAB), the memory data register 500 and the internal bus (IB). The command words input to the control unit 300 in this manner are parsed. Accordingly, necessary control signals (CONT) are output from the control unit 300, in a manner that corresponding command words are executed.

If the CPU is initialized and the debugging mode entry signal (OSI) is in an inactivation state by the reset vector, in order to execute the application program (PROG1) for debugging, the CPU executes the application program (PROG1).

If the CPU is initialized by the reset signal and the debugging mode entry signal (OSI) input to the control unit 300 is activated, the control unit 300 activates the status register (SR) and the debugging mode flag (OSIM). Also, the control unit 300 reads a debugging mode initialization vector being a start address of the debugging mode initialization program (PROG3) stored in the memory 80 and stores the read result in the program counter (PC). Then, if the debugging mode initialization program (PROG3) is executed according to a debugging mode initialization vector stored in the program counter (PC), the CPU is set as an initial circumstance for testing and debugging the application program.

The control unit 300 inactivates the debugging mode flag (OSIM) of the status register (SR) according to a command input from the host computer, and controls the address at which the command word of the application program to be executed to be stored in the program counter (PC), to thereby execute the application program. If the value (IBR) stored in the break register (BR) of the special register file 200 is same as the break data (BD) during execution of the application program, in the comparison result of the comparator 700, the CPU stops or completes the execution operation of the application program, controls the value of the address of the application program stored in the program counter (PC) and the data stored in the status register (SR) to be stored in the temporary storage register (TR) 1200, controls a debugging service vector being the start address of the debugging service program (PROG5) for testing and debugging the application program to be stored in the program counter (PC), and alters the value of the status register (SR) of the CPU so that the application program is in the state of being tested and debugged. That is, the debugging mode flag (OSIM) of the status register (SR) is activated.

Meanwhile, if the value (IBR) stored in the break register (BR) is same as the break data (BD), in the comparison result of the comparator 700, the CPU stops or completes the execution operation of the application program and can control the value stored in the program counter (PC) and the data stored in the status register (SR) to be stored not in the temporary storage register (TR) but in the stack memory designated by the debugging stack pointer (ISP).

The CPU advances to the program testing and debugging state, and then performs commands from the host computer, for example, such as a download of the application program made up by a user, execution of the downloaded application program, data change of the break register (BR), read (READ) or write (WRITE) of the data stored in the registers of the universal register file 100 and the special register file 200, and read or write of the data stored in the memory according to the debugging service program (PROG5) stored in the memory 80. A user judges whether the application program is correctly made up using the commands. If it is judged that the application program is wrongly made up, the application program is corrected.

The processing sequence for performing the commands between the CPU and the host computer via the data communications unit follows.

If the program made up by the user is received by the CPU via the data communications unit 600 according to the download command from the host computer and controls the received program in the memory of the CPU, the CPU transmits to the host computer a signal representing that the program has been successfully received. If an error occurs during transmission of the application program, the CPU requests the host computer to re-transmit the application program. After the application program has been downloaded to the CPU, the host computer outputs a break register data change command for setting the data value of the break register (BR) in the CPU, in order to perform a debugging operation. After the break register data change command, the CPU transmits to the host computer a signal representing that the application program has been successfully received. The host computer transmits to the CPU the execution command of the application program in order to execute the application program downloaded in the memory, and the CPU executes the application program in reply to the execution command of the application program. If the data value stored in the break register (BR) is same as that of the program counter (PC) being the break data (BD) during execution of the application program, in the comparison result of the comparator 700, the execution operation of the application program is stopped or completed, and all of the value stored in the program counter (PC), the data stored in the status register (SR), and contents of the universal register are stored in the temporary storage register (TR) or the stack memory designated by the debugging stack pointer (ISP). A debugging service vector being the start address of the debugging service program (PROG5) for testing and debugging the application program is stored in the program counter (PC), and the data of the status register (SR) is altered, so that the CPU is in the state of testing and debugging the application program. That is, the debugging mode flag (OSIM) of the status register (SR) is activated. The CPU advances to the state for testing and debugging the application program according to the debugging service program (PROG5). If the CPU has advanced to the debugging mode for testing and debugging the application program and then receives a register read command, the data of the register stored in the temporary storage register (TR) or the stack designated by the debugging stack pointer (ISP) is transmitted to the host computer. Then, the user analyzes the transmitted data and judges whether a correct value is output or not. If the transmitted data is not the correct data in the result of the analysis, the application program is determined incorrect. Accordingly, the application program is corrected.

Repeating the above method, the application program can be easily debugged.

The reset signal (RESET) is activated when power is initially applied to the CPU. Otherwise, the reset data comparator 1000 compares the debugging data (DEB2) input from the host computer via the data communications unit 600 with the reset data stored in the reset data storage unit 1100, and if the former is same as the latter, the CPU is initialized. In other words, in the case that the CPU is in an irrecoverable state during execution of the application program to be debugged, for example, in the state of an endless loop, the CPU is initialized to solve the problem.

In the case that an application program is being executed continuously for more than a predetermined time, that is, in the case that the application program is in the state of an endless loop, the debugging data (DEB1) identical to the reference data stored in the reference data storage unit 900 is transmitted via the data communications unit 600, the reference data comparator 800 compares the reference data stored in the reference data storage unit 900 with the debugging data (DEB1) received via the data communications unit 600, and if the former is same as the latter in the result of comparison, the CPU is forced to advance to the debugging service mode being the program testing and debugging state, to thereby escape from the endless loop to debug the application program where the endless loop occurred.

As shown in FIG. 5C, the debugging mode initialization programs (PROG3 and PROG6) and the debugging service programs (PROG5 and PROG7) can be stored in both the memory 80 storing the service program for initializing and operating the CPU and the memory 90 separated from the memory 80. For this purpose, the memory identification signal (OSIROM) is required as the input signal of the control unit 300. That is, after the control unit 300 has initialized the CPU by the reset signal (RESET), and then if the debugging mode entry signal (OSI) has been checked as being activated and if the memory identification signal (OSIROM) has been checked as being activated, a debugging mode initialization vector II being the start address of the debugging mode initialization program (PROG6) stored in the memory 90 in order to test and debug the application program should be stored in the program counter (PC). Also, in the case that the data value of the break register (BR) is same as the break data, the comparator 700 informs the control unit 300 that two values are same, and the control unit 300 controls the program counter (PC) to store a debugging service vector II being the start address of the debugging service program (PROG7) stored in the memory 90.

If the memory identification signal (OSIROM) is inactivated, a debugging mode initialization vector I is a start address for performing the debugging mode initialization program (PROG3) and a debugging service vector I is a start address for performing the debugging service program (PROG5).

As described above, if the memories are separated and used, a user does not use the internally stored debugging mode initialization program (PROG6) and the debugging service program (PROG7), and uses the user made debugging mode initialization program (PRO3) and the debugging service program (PROG5), to thereby test and debug the application program.

Also, in the CPU for easily testing and debugging programs according to the present invention, the CPU is initialized by the reset signal (RESET). Then, the CPU is converted into an initial debugging mode by the debugging mode entry signal (OSI). Otherwise, the CPU is compulsorily converted into an initial debugging mode by the control unit 300 according to the input of the debugging data (DEB1) identical to the reference data stored in the reference data storage unit 900 via the data communications unit 600 from the host computer during execution of the application program. Accordingly, if the debugging program composed of the debugging initialization program and the debugging service program is executed, the value of the break register (BR) can be set in the host computer according to the debugging program. The set data of the break register (BR) is stored in the break register (BR) via the data communications unit 600, and if the value (IBR) stored in the break register (BR) is same as the break data (BD) during execution of the application program, the CPU always advances to the debugging mode irrespective of the activation or inactivation of the debugging mode entry signal (OSI). That is, if the value (IBR) stored in the break register (BR) is same as the break data (BD), the control unit 300 activates a debugging mode flag (OSIM) of the status register (SR), and loads the start address for performing the debugging program in the program counter (PC). Accordingly, the control unit 300 controls the CPU to perform the debugging program to thereby control the CPU to be converted into the debugging mode. Also, the control unit 300 performs commands from the host computer via the data communications unit 600 according to the debugging program, for example, an initialization of memories to be used for the debugging program, a set of a debugging stack pointer, a set or alteration of reference data, a set or alteration of reset data for initializing the CPU, an alteration of value of the break register (BR), a read (READ) or write (WRITE) of data stored in the registers of the universal register file 100 or the special register file 200, and a read or write of data stored in the memories, and judges whether the application programs are correctly made up, to thereby correct and modify the incorrect application programs.

The CPU for easily testing and debugging programs according to the present invention newly adds a debugging mode in a state of the CPU having a user mode, to thereby enable the CPU to easily test and debug the application programs downloaded from the host computer at a debugging mode. Here, the CPU is fabricated with simpler hardware units, which can lower a price of the CPU and enable a more efficient testing and debugging. Also, the debugging mode initialization program for setting the CPU into an initial circumstance for testing and debugging the application program, and the debugging service program for testing and debugging the application program by making the CPU advance to the program testing and debugging state, are stored in other independent memory than the memory storing the user application program for initializing and operating the CPU. Accordingly, the user need not consider the provided debugging mode initialization program and the debugging service program, and can make up an application program using the debugging program made up by the user.

What is claimed is:

1. A central processing unit (CPU) for easily testing and debugging an application program, including a universal register file for temporarily storing data necessary for operation of data and address, a program counter storing addresses at which programs are stored, a special register file having a status register indicating a status of the CPU and a break register, an internal bus connecting the universal register file and the special register file, and a control unit connected to the internal bus, for outputting various control signals necessary for internal and external components of the CPU, the CPU comprising:

a data communications unit for performing data communications with a host computer;

a status register having a flag representing whether an operational mode of the CPU is a general operational mode representing a general operational state or a debugging mode representing a debugging state;

a debugging stack pointer register which is used as a stack pointer designating a stack memory storing data of a debugging program;

a comparator for comparing a value stored in a break register with break data;

a reset data storage unit storing reset data; and a reset data comparator for comparing the data input via the data communications unit with the reset data stored in the reset data storage unit, and instructing the control unit to initialize the CPU if the data input via the data communications is same as the reset data, wherein the CPU is converted into he debugging mode if the break register value is same as the break data, the flag of the status register has a value representing a debugging mode, a start address for performing a debugging program is loaded in a program counter, and the debugging program is executed to perform a debugging according to a command from the host computer via the data communications unit.

2. The CPU of claim 1, wherein said break data is a program address stored in the program counter.

3. The CPU of claim 1, further comprising a mask register, wherein the break data is a result of operation of the values stored in the program counter and the mask register.

4. The CPU of claim 1, wherein the break data is a memory address at which data is stored.

5. The CPU of claim 1, further comprising a mask register, wherein the break data is a result of operation of a memory address at which data is stored and the value stored in the mask register.

6. The CPU of claim 1, wherein said break data is data input to and output from the CPU.

7. The CPU of claim 1, further comprising a mask register, wherein the break data is a result of operation of data input to and output from the CPU and the value stored in the mask register.

8. The CPU of claim 1, wherein said break data is an address input to and output from the CPU.

9. The CPU of claim 1, further comprising a mask register, wherein the break data is a result of operation of an address input to and output from the CPU and the value stored in the mask register.

10. The CPU of claim 1, wherein said control unit receives a debugging memory select signal and loads a respectively different address for performing a debugging program in the program counter according to the debugging memory select signal when the value stored in the break register is same as the break data.

11. The CPU of claim 1, further comprising a data storage memory storing data values used for a debugging program, which is separated from a data storage memory storing data values used for a general program.

12. The CPU of claim 1, further comprising a memory storing a debugging program, which is separated from a memory storing a general program.

13. The CPU of claim 1, wherein an application program to be tested and debugged is downloaded from the host computer via the data communications unit.

14. The CPU of claim 1, wherein the value stored in the program counter and the data stored in the status register are stored in a memory designated by the debugging stack pointer register, when the CPU has been converted into a debugging mode.

15. The CPU of claim 1, further comprising a temporary storage register, wherein the value stored in the program counter and the data stored in the status register are stored in a temporary storage memory when the CPU has been converted into a debugging made.

16. The CPU of claim 1, further comprising:

a reference data storage unit storing reference data; and a reference data comparator for comparing the data input via the data communications unit with the reference data, wherein the control unit controls the CPU to be converted into a debugging mode, and loads a start address for performing a debugging program in the program counter, if the data input via the data communications is same as the reference data, to thereby control the CPU to perform a debugging according to a command from the host computer via the data communications unit.

17. A central processing unit (CPU) for easily testing and debugging a program, including a universal register file for temporarily storing data necessary for operation of data and address, a program counter storing addresses at which programs are stored, a special register file having a status register indicating a status of the CPU and a break register, and an internal bus connecting the universal register file and the special register file, the CPU comprising:

a data communications unit for performing data communications with a host computer;

a status register having a flag representing whether an operational mode of the CPU is a general operational mode representing a general operational state or a debugging mode representing a debugging state;

a debugging stack pointer register designating a stack memory storing data of a debugging initialization program and data of a debugging service program;

a control unit for initializing the CPU by a rest signal, checking a debugging mode proceeding signal, loading a start address for performing a debugging initializing program in a program counter if the debugging mode proceeding signal has been activated, to thereby converting the CPU into the debugging initialization mode, and setting the flag of the status register into a value representing the debugging mode, and outputting various control signals necessary for internal and external components of the CPU connected to an internal bus; and a comparator for comparing a value stored in a break register with break data;

a reset data storage unit storing reset data; and a reset data comparator for comparing the data input via the data communications unit with the reset data stored in the reset data storage unit, and instructing the control unit to initialize the CPU if the data input via the data communications is same as the reset data, wherein the CPU is converted into the debugging mode if the break register value is same as the break data, the flag of the status register has a value representing a debugging service mode, a start address for performing a debugging service program is loaded in a program counter, and the debugging service program is executed to perform a debugging according to a command from the host computer via the data communications unit.

18. The CPU of claim 17, wherein said break data is a program address stored in the program counter.

19. The CPU of claim 17, further comprising a mask register, wherein the break data is a result of operation of the values stored in the program counter and the mask register.

20. The CPU of claim 17, wherein the break data is a memory address at which data is stored.

21. The CPU of claim 17, further comprising a mask register, wherein the break data is a result of operation of a memory address at which data is stored and the value stored in the mask register.

22. The CPU of claim 17, wherein said break data is data input to and output from the CPU.

23. The CPU of claim 17, further comprising a mask register, wherein the break data is a result of operation of data input to and output from the CPU and the value stored in the mask register.

24. The CPU of claim 17, wherein said break data is an address input to and output from the CPU.

25. The CPU of claim 17, further comprising a mask register, wherein the break data is a result of operation of an address input to and output from the CPU and the value stored in the mask register.

26. The CPU of claim 17, wherein said control unit receives a debugging memory select signal and loads a respectively different address for performing a debugging program in the program counter according to the debugging memory select signal when the value stored in the break register is same as the break data.

27. The CPU of claim 17, further comprising a data storage memory storing data values used for a debugging program, which is separated from a data storage memory storing data values used for a general program.

28. The CPU of claim 17, further comprising a memory storing a debugging program, which is separated from a memory storing a general program.

29. The CPU of claim 17, wherein an application program to be tested and debugged is downloaded from the host computer via the data communications unit.

30. The CPU of claim 17, further comprising a temporary storage register, wherein the value stored in the program counter and the data stored in the status register are stored in a temporary storage memory when the CPU has been converted into a debugging mode.

31. The CPU of claim 17, further comprising:

a reference data storage unit storing reference data; and a reference data comparator for comparing the data input via the data communications unit with the reference data, wherein the control unit controls the CPU to be converted into a debugging mode, and loads a start address for performing a debugging program in the program counter, if the data input via the data communications is same as the reference data, to thereby control the CPU to perform a debugging according to a command from the host computer via the data communications unit.

* * * * *